US007016845B2

(12) United States Patent
Vora et al.

(10) Patent No.: US 7,016,845 B2
(45) Date of Patent: Mar. 21, 2006

(54) METHOD AND APPARATUS FOR PROVIDING SPEECH RECOGNITION RESOLUTION ON AN APPLICATION SERVER

(75) Inventors: Ashish Vora, Naperville, IL (US); Kara Lynn Sprague, Cambridge, MA (US); Curtis Tuckey, Chicago, IL (US); Arvind Gupta, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/449,174

(22) Filed: May 30, 2003

(65) Prior Publication Data

US 2004/0093216 A1 May 13, 2004

Related U.S. Application Data

(60) Provisional application No. 60/425,178, filed on Nov. 8, 2002.

(51) Int. Cl.
*G10L 15/26* (2006.01)
(52) U.S. Cl. .................................. 704/270.1
(58) Field of Classification Search ............... 704/251, 704/255, 257, 270.1, 275, 231, 270; 379/88.02, 379/88.22, 88.17, 88.16; 707/4; 706/55
See application file for complete search history.

(56) References Cited

U.S. PATENT DOCUMENTS

| 5,915,001 | A  | * | 6/1999  | Uppaluru ............... 379/88.22 |
| 5,999,525 | A  | * | 12/1999 | Krishnaswamy et al. ... 370/352 |
| 6,400,806 | B1 | * | 6/2002  | Uppaluru ............... 379/88.02 |
| 6,456,972 | B1 | * | 9/2002  | Gladstein et al. ........... 704/257 |
| 6,560,590 | B1 | * | 5/2003  | Shwe et al. ................ 706/55 |
| 6,615,172 | B1 | * | 9/2003  | Bennett et al. ............. 704/257 |
| 6,633,846 | B1 | * | 10/2003 | Bennett et al. ............. 704/257 |
| 6,665,640 | B1 | * | 12/2003 | Bennett et al. ............. 704/257 |
| 6,801,604 | B1 | * | 10/2004 | Maes et al. ............. 379/88.17 |
| 6,801,892 | B1 | * | 10/2004 | Yamamoto ................ 704/256 |
| 6,807,529 | B1 | * | 10/2004 | Johnson et al. ........... 704/270.1 |

* cited by examiner

*Primary Examiner*—Susan McFadden
(74) *Attorney, Agent, or Firm*—Welsh & Katz, Ltd.; James A. Scheer, Esq.

(57) ABSTRACT

A method of providing speech recognition resolution on an application server in a communication network includes receiving an utterance from an end-user, for example, at a Voice Gateway in response to a prompt by an application prompt, capturing the utterance, and dispatching it via the application server to a speech recognition provider. The method further includes performing item-matching via a search algorithm, returning items matching the utterance to the application server, and returning relevant utterance matches to the application, for example, on the Voice Gateway, for communication to the user.

22 Claims, 16 Drawing Sheets

1700

Search Server: Registered Search Spaces

STARTED ⊙ Oracle Corporate Directory

STARTED ⊙ CRM Part Number

STOPPED ⊙ Yellow Pages CA

Search Server: Create New Search Space (from DB)

Search Space Name: Oracle Corporate Directory US

DB Connect String: username/password@127.0.0.1:1521:database

JDBC Driver Type: THIN

Dataset Generator:
```
SELECT first_name, last_name
FROM directory
WHERE directory.country LIKE 'USA'
```

*Fig. 17B*

METHOD AND APPARATUS FOR PROVIDING SPEECH RECOGNITION RESOLUTION ON AN APPLICATION SERVER

BACKGROUND

This application claims the benefit of U.S. Provisional Application No. 60/425,178, filed Nov. 8, 2002 the entire content of which is hereby incorporated by reference. The field of the invention relates, in general, to speech recognition, and more particularly to a method and apparatus for providing speech recognition resolution on an application server.

A Voice application written for example in VoiceXML (a derivative of the Extensible Markup Language (XML)) processes spoken input from a user through the use of grammars, which define what utterances the application can resolve. VoiceXML (VXML) allows a programmer to define a "graph" that steps a user through a selection process— known as voice dialogs. The user interacts with these voice dialogs through the oldest interface known to mankind: the voice. Hence, VoiceXML is a markup language for building interactive voice applications which, for example, function to provide recognition of audio inputs such as speech and touch-tone Dual Tone Multi-Frequency (DTMF) input, play audio, control a call flow, etc. . . .

A VoiceXML application comprises a set of VoiceXML files. Each VoiceXML file may involve one or more dialogs describing a specific interaction with the user. These dialogs may present the user with information and/or prompt the user to provide information. A VoiceXML application functions similar to an Internet-based application accessed through a web browser, in that it typically does not access the data at a dial-in site but often connects to a server that gathers the data and presents it. The process is akin to selecting a hyperlink on a traditional Web page. Dialog selections may result in the playback of audio response files (either prerecorded or dynamically generated via a server-side text-to-speech conversion).

Grammars can be used to define the words and sentences (or touch-tone DTMF input) that can be recognized by a VoiceXML application. These grammars can, for example, be included inline in the application or as files, which are treated as external resources. Instead of a web browser, VoiceXML pages may be rendered through Voice Gateways, which may receive VoiceXML files served up by a web or application server as users call in to the gateway.

Voice Gateways typically comprise seven major components, as follows: a Telephony Platform that can support voice communications as well as digital and analog interfacing, an ASR Engine, a Text To Speech synthesis (TTS) engine, a Media Playback engine to play audio files, a Media Recording engine to record audio input, a Dual Tone Multi-Frequency (DTMF) Engine for touchtone input, and a Voice Browser (also known as a VoiceXML Interpreter). When a VoiceXML file is rendered by a Voice Gateway, the grammars may be compiled by the ASR (Automated Speech Recognition) engine on the Voice Gateway.

The resolution capabilities of standard ASR engines are often fairly limited because performance in resolving utterances declines quickly with size, typically limiting grammar sizes to the order of a few thousand possible utterances. In the past, this problem with using large grammars for applications such as directory automation services was sometimes addressed through the use of specialized hardware and software solutions, which included a telephony interface, resource manager, specialized ASR and TTS engine, customized backend data connectivity, and proprietary dialog creation environments integrated together in one package. The specialized ASR in these packages is sometimes capable of resolving grammars with millions of allowable utterances. However, this specialized hardware and software solution has many drawbacks, for example it does not take advantage of the centralization of data and standardization of data access protocols. Furthermore, these specialized systems often create a requirement that the call flow elements of a large-scale grammar application must be designed as part of the proprietary dialog creation environment, which effectively makes these applications non-portable. Furthermore, utilization of these specialized systems often locks users into the particular TTS engines and telephony interfaces provided as part of the specialized system, further reducing the ability to switch implementations of the underlying large-scale search technology.

Enabling large-scale grammar resolution through an application server resolves many of these drawbacks. Specifically, enabling large-scale grammar resolution in the application server can allow the information and data resources that will make up the large scale grammar to remain in a centralized location. Application servers make use of a variety of industry standard data connectivity methods and protocols. Taking advantage of this data centralization allows for reduced duplication of data and memory state. Additionally, by consolidating large-scale grammar resolution through an application server, administration of the large-scale search technology can be simplified.

Large-scale grammar resolution through an application server can further allow application developers to write their applications in any language supported by the application server, rather than in the proprietary format of a Dialog Creation Environment. Application developers can therefore make use of standard programming conventions, execution models, and APIs (Application Programming Interfaces) when writing their applications.

SUMMARY

In one embodiment, a method for speech recognition resolution on an application server in a communication network is provided which includes receiving an utterance from an end-user or an application in response to a prompt by an application, such as a VoiceXML application, and capturing the utterance and dispatching it via the application server to a speech recognition engine, for example, a large-scale grammar search technology. The method further includes performing item-matching via a search algorithm, returning items matching the utterance to the application server, and returning relevant utterance matches to the application for communication to the user.

BRIEF DESCRIPTION OF DRAWINGS

The invention, together with the advantages thereof, may be understood by reference to the following description in conjunction with the accompanying figures, which illustrate some embodiments of the invention.

FIGS. 17A and 17B are examples of graphical user interface displays illustrating embodiments of form box dialogs for registering and creating new search spaces on a search server to configure and administer large-scale grammar resolution on an application server

DETAILED DESCRIPTION

Figure 1:
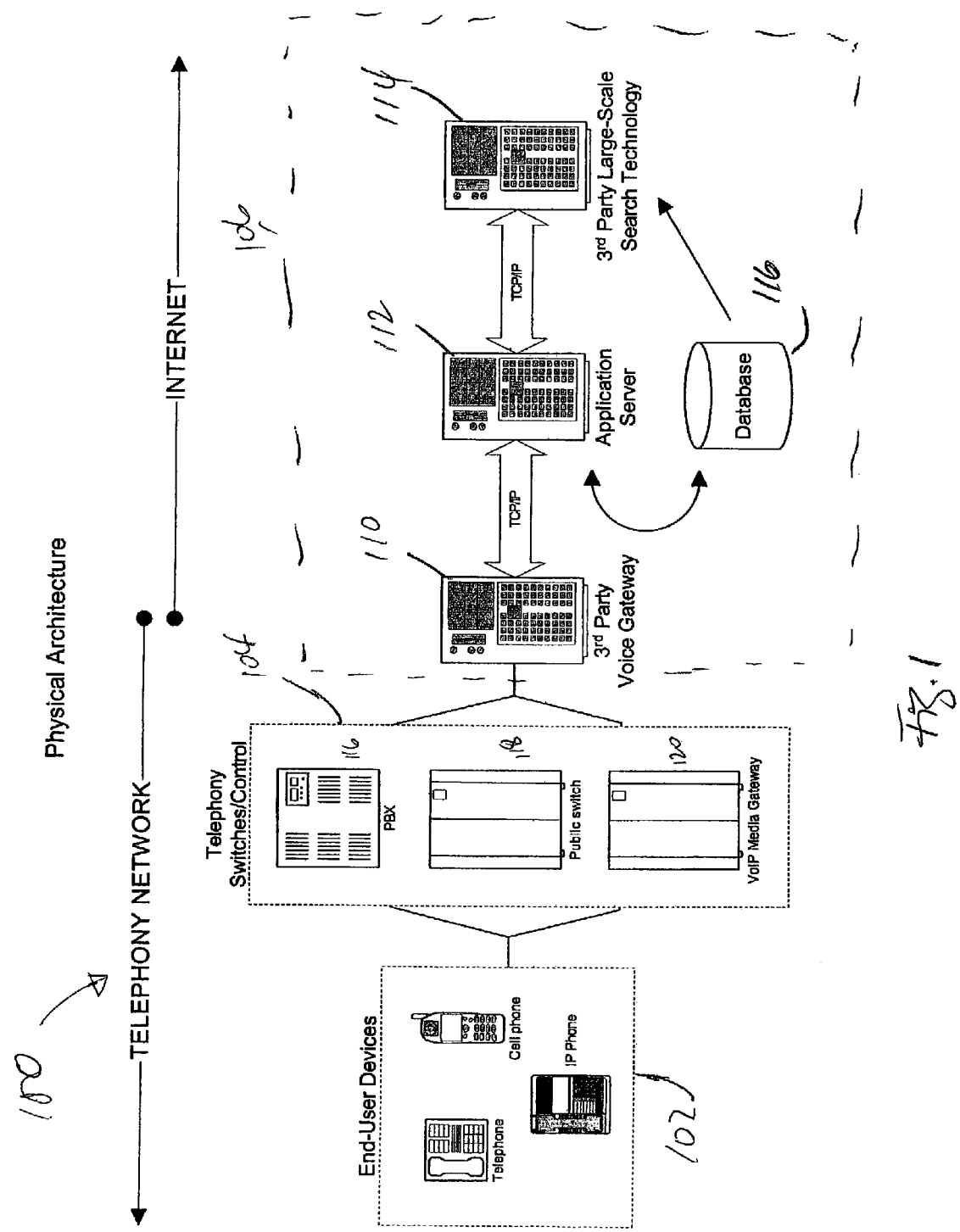
FIG. 1 is a functional block diagram illustrating an example communication network suitable for speech recognition that utilizes large-scale grammar resolution on an application server.

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. Thee use of definite or indefinite articles is not intended to indicate cardinality. In particular, a reference to "the" object or "a" object is intended to denote also one of a possible plurality of such objects.

FIG. 1 is a functional block diagram illustrating an example of a communication network 100 suitable for speech recognition that utilizes speech recognition resolution such as large-scale grammar resolution on an application server 112. In this example the communication network 100, includes a data network 106, which may be any suitable network, for example, the Internet, an Extranet or Intranet, etc. . . . The network 106 is connected in this embodiment to an end user device 102, such as a landline telephone, a cellular phone, or an Internet Protocol phone via a telephone switch or other control system 104.

In a specific embodiment, the communication network 100 allows an end user to make a voice channel connection to the data network 106 for audio communication over a voice based telephony communication system such as a telephony switch/control system 104, examples of which include the following systems: a public telephone switch 118, a VoIP (Voice over Internet Protocol) media gateway 120, a Private Branch Exchange (PBX) system 116, etc. For example, the public switch 118 may be any public carrier and may also include other communication networks; it may include a wireless telecommunication network that provides connectivity to the public switched telephone network (PSTN), control functions, and switching functions for wireless users, as well as connectivity to Voice Gateways.

The exemplary communication network 100 shown comprises a Voice Gateway 110, which is coupled to the telephony switch/control system 104, for example the public switch 118. The telephony switch/control system 104 couples the audio communication from the Voice Gateway 110 to the suitable (voice receiver) end user device 102. An application server 112, which may be any suitable server such as Oracle9iAS, is coupled to the Voice Gateway 110 and to a large-scale search engine 114, as shown. The application server 112 may, for example, run a Web site, or Internet application, and in one embodiment allows the Website or the application to be accessible from any browser or mobile device.

The application server 112 may be coupled to a database 116 as shown. This database 116 may, in one embodiment, host the dataset to be treated as a large-scale grammar and may be synchronized as needed by the application server 112. The database 116 may be coupled to the large-scale search engine 114 to provide the data sets required for initializing the grammar in item matching searches.

Referring to FIG. 1, the Voice Gateway 110 provides an audio communication bridge between the telephony/switch control system 104, and the application server 112 as shown using any standard format. As indicated earlier, a Voice Gateway 100 can support multiple technologies including, but not limited to Automated Speech Recognition (ASR), Text-To-Speech (TTS) technologies, browser functionalities (e.g. for connecting to the Internet using standard TCP/IP [Transmission Control Protocol over Internet Protocol] protocols to interpret voice data in formats such as Voice XML, SALT, XHTML+V, etc. . . . ), media playback and recording capabilities and telephony technologies to connect the system to the telephony network. Examples of other protocols and languages that may be used in various embodiments include, but are not limited to: WAP (Wireless Application Protocol), HTML (Hyper Text Markup Language), HDML/WML, MXML, XHTHL, etc.

Referring to the embodiment of FIG. 1, the application server 112 interacts with both the Voice Gateways 110 and the large-scale search providers 114, for example, third party search providers. This interaction can involve, for example, user management, session management, and Voice XML (VXML) delivery to the Voice Gateway 110 end of the communication path. This interaction may further involve large-scale search server configuration, search space administration, and third party large-scale search technology administration at the third party provider 114 end of the communication path. The third party large-scale search providers 114 may be designed to provide state-of-the-art voice search algorithms, as well as multiple dictionaries and search spaces. In some embodiments the third party large-scale search provider may be integrated with the application server and/or may be provided by the provider of other technology in the system.

The methods disclosed herein may be performed by the application server 112 or some other processor using instructions that may reside on a computer-readable medium. The computer-readable medium may be any suitable computer readable storage medium such as, but not limited to random access memory, read-only memory, flash memory, CDROM, DVD, solid-state memory, magnetic memory, optical memory, and the like.

Figure 2:
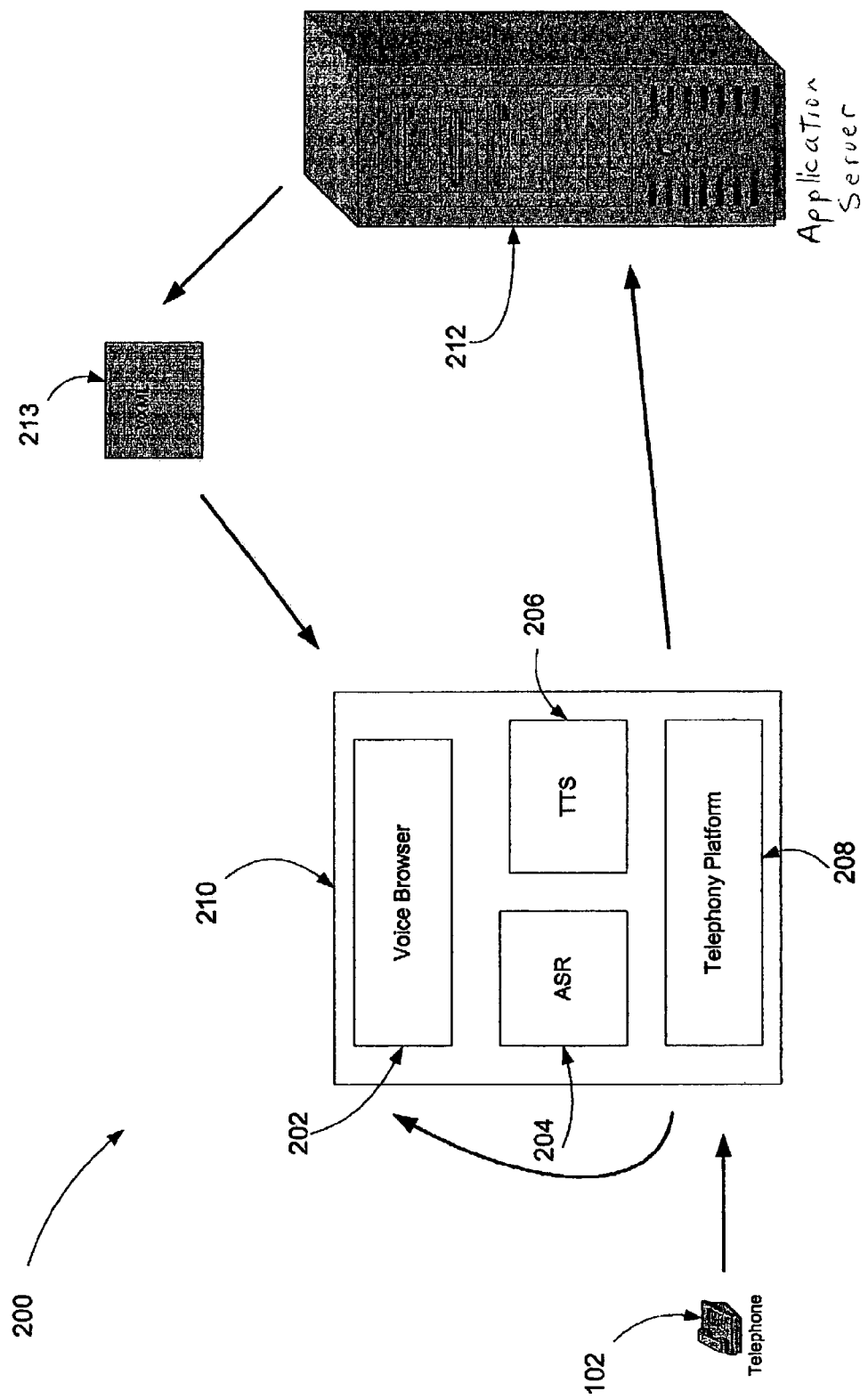
FIG. 2 is a functional block diagram illustrating an embodiment of a Voice Gateway voice-enabling Internet configuration that may be utilized to access a large-scale grammar application accessed through an application server

FIG. 2 is a functional block diagram illustrating an embodiment of a voice-enabling Internet content system 200 including a Voice Gateway 210 that may be utilized to access a large-scale grammar application accessed through an application server. In the embodiment of FIG. 2, when a user initiates a telephone call from an end-user device 102, the call is routed to a Voice Gateway 210 via a telephony/switch control system 104 (see FIG. 1) based on the characteristics of the phone number dialed. Subsequently, during the call, a telephone request by the user is translated to an Internet URI (Uniform Resource Identifier) and sent to the Voice Gateway's voice browser 202. In turn, the voice browser 202 may initiate an Internet request over IP to get the requested content from a Web server, such as the application server 212. The application server 212 returns a VoiceXML document 213 back to the voice browser 202. The voice browser 202 renders the VXML document content with the help of ASR 204 and TTS 206 engines, and sends the content to the user. In an alternative embodiment, the mark-up language could by HTML+EcmaScript on a PC or Palm device with recording capabilities.

Figure 3:
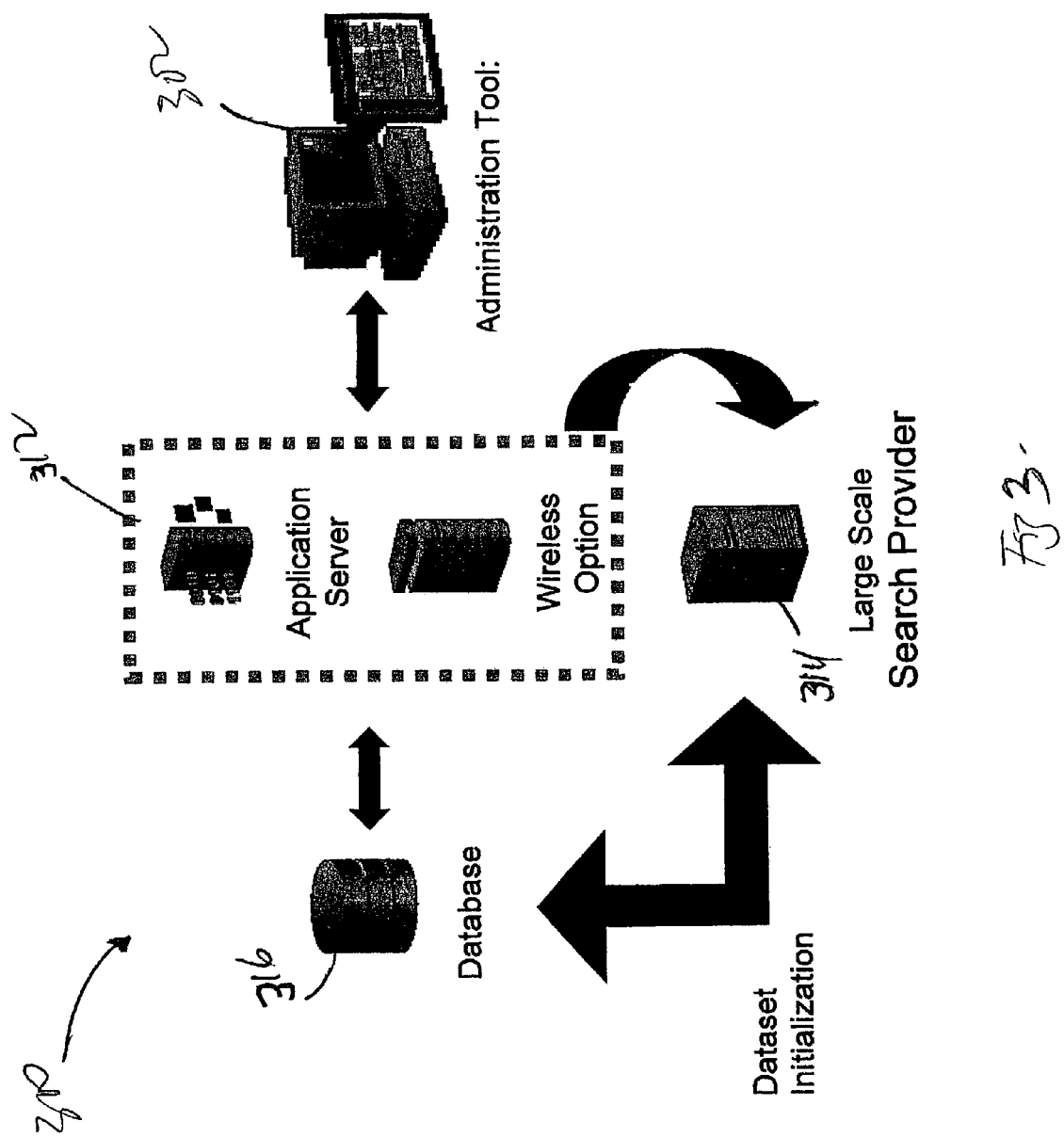
FIG. 3 is a functional block diagram illustrating an embodiment of a large-scale grammar search configuration and administration capability that may be utilized to provide large-scale grammar resolution on an application server

FIG. 3 is a functional block diagram illustrating an embodiment of a large-scale grammar search configuration and administration tool 300 that may be utilized in a method to provide large-scale grammar resolution on an application server. In the embodiment of FIG. 3, large-scale grammar resolution through the application server 312 utilizes a system configuration tool that permits administration of a large-scale grammar technology by any application or application developer. Thus access is provided to the necessary large-scale grammar technology without additionally requiring an application developer to configure hardware and/or software particular to the large-scale grammar technology provider.

In the specific system configuration illustrated in FIG. 3, a web-based administration tool 302 that may be accessed, for example, from a personal computer is coupled to the application server 312. As illustrated, in one alternative, the application server may include the capability to deliver applications to wireless devices (wireless option). In turn, the application server 312 is coupled to a database 316 that contains the dataset to be treated as a large-scale grammar. The application server 312 is also coupled to a large-scale grammar search provider technology 314, for example, via the TCP/IP communication protocol. This large-scale grammar search provider 314 may in one embodiment utilize voice search algorithms that return matches corresponding to an end user utterance by utilizing multiple dictionaries and search spaces. These matches are typically returned to the application server 312 as an ordered list of elements. The application server 312 keeps track of the different available search provider technologies, creates and manages search spaces, and is in effect the administrator of the large-scale grammar search provider 314.

The search spaces may typically be defined by a number of protocols such as the LDAP (Lightweight Directory Access Protocol, used for accessing online directory services), by relational DB (Data Base) information/retrieval tools such as the database Connect String and the SQL (Structured Query Language) query, by Flat File access, and by other known data store protocols including but not limited to Object-Oriented DB's, hierarchical DB's, etc. The term "search space" is used to refer to any generalized dataset, which may include but is not limited to the following examples: a table in a database, a set of LDAP entries, or a delimited flat file, which has been initialized and primed in a large-scale voice search engine. The application server 312, as shown in the embodiment of FIG. 3, verifies that each large-scale grammar search provider 314 is primed and initialized to resolve each grammar defined in the search spaces of the administration tool 302. This system configuration permits applications that use large-scale grammars to be developed and used in the same manner as any other application on the application server 312.

Whenever a new third-party large-scale grammar search technology provider is introduced to the system administration tool 302, it may be subsequently registered with the application server 312 (via its large-scale search server). Further, when the system administration tool 302 is used to initialize a new search space (e.g. consisting of a dataset and its related voice-searchable fields), the large-scale search server component of the application server 312 notifies the third-party large-scale grammar technology provider 314 that there is a new search space that needs to be initialized. Subsequently, the third-party large-scale search technology provider 314 performs the necessary priming and initialization steps to configure the new search space and maintain it as an available dictionary or grammar set. An application developer can then write and deploy an application through the application server 312 and utilize the new third-party large-scale search technology.

The inputs to a large-scale voice search system can in some embodiments be a dataset and a user utterance. The output of the system may be a weighted list of entries from the dataset that phonetically match the user utterance. Due to the technical requirements of initialization and priming, datasets preferably are provided and initialized on the third party large-scale search system prior to runtime. Hence, the large-scale voice search server component of the application server 312 then addresses two technical issues. The first issue concerns the establishing, specifying and maintaining a set of search spaces. The second issue relates to the access of a particular large-scale search provider's technology 314 and the querying of a particular search space with a user utterance and navigation through the weighted result set.

In one example, the wireless option of the application sever 312 utilizes wireless capabilities to provide a web-based administration tool through which search spaces are defined and maintained. This portal is referred to as the "large-scale voice search server". In addition, search interfaces and drivers can be used to facilitate the communication between the search server and multiple search providers 314. For example, a single, generalized search API could be utilized by application developers for performing searches, and by the administration tool to handle the details of driver and search space initialization. The use of a generic search driver would abstract the differences between the various search provider drivers, whereas specific search provider drivers would format and transmit messages in a manner specific to the corresponding large-scale search technology.

Figure 4:
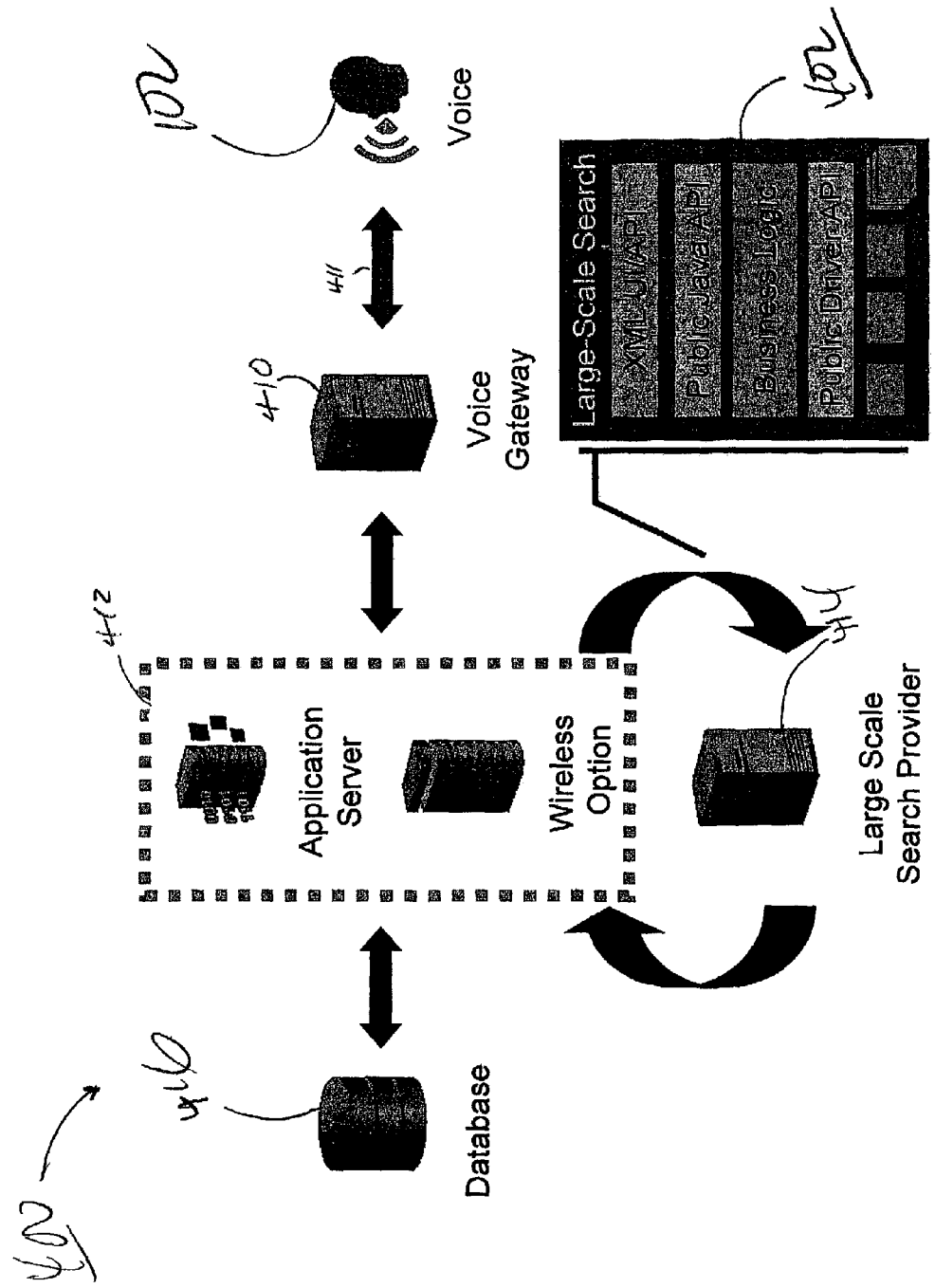
FIG. 4 is a functional block diagram illustrating an embodiment of a voice search application that utilizes large-scale grammar resolution on an application server.

FIG. 4 is a functional block diagram illustrating an embodiment of a voice search configuration 400 that utilizes large-scale grammar resolution on an application server 412. In a directory application, for example, an end user 102 may call a number on a Voice Gateway 410 on an input line 411, which then requests from an application server 412 an application corresponding to that input line 411 on the Voice Gateway 410. The application server 412 interactions with the Voice Gateway 410 may include, for example, user management, session management, and VXML generation. The application server 412 serves up the application to the Voice Gateway 410, and maintains the application state to process large-scale voice searches.

In one embodiment, the Voice Gateway 410 may capture a user utterance in response to the application prompts. The user utterance may originate from any suitable source, for example, a live end user, an application, etc. If the utterance to be interpreted is part of a small grammar, then the corresponding grammar may be stored in a grammar file to be accessed and cached at the same time as the VoiceXML document is served to the Voice Gateway 410. In this case, the processing of the utterance against the application grammar can occur at application runtime using the standard ASR engine on the Voice Gateway 410. If the utterance to be interpreted is part of a large-scale voice search, then in one embodiment the utterance is recorded by the Voice Gateway 410 and sent to the application server 412. The recorded utterances are dispatched to the third-party large-scale technology search provider 414 by the application server's large-scale search server, along with a specification of the search space to be used and the contents of the recording (data fields to be matched).

Once the third-party large-scale search technology search provider 414 receives the utterance and associated information from the application server 412, it then may perform a search algorithm over the corresponding maintained dictionary (or grammar set), and return items matching the utterance from the specified search space, for example, in the form of an ordered list of elements (also called an n-best list) and corresponding confidence metrics. Further, the application server 412 may use the list as an index into the selected search space to return the specific data relevant to the application, and may then serve up a new markup page to the Voice Gateway 410. The large-scale search application, as shown in block 402, may make use of a number of components. Specifically, in one embodiment, the application may have an XML UI/API (User Interface/Application Programming Interface) layer used to present the user interface of the application. The XML layer may make application calls to the Public Java API which represents the generalized large-scale search API. The generalized public Java API may in turn invoke a public Driver API which abstracts away the specific implementation details of any one large-scale search provider technology.

Figure 5:
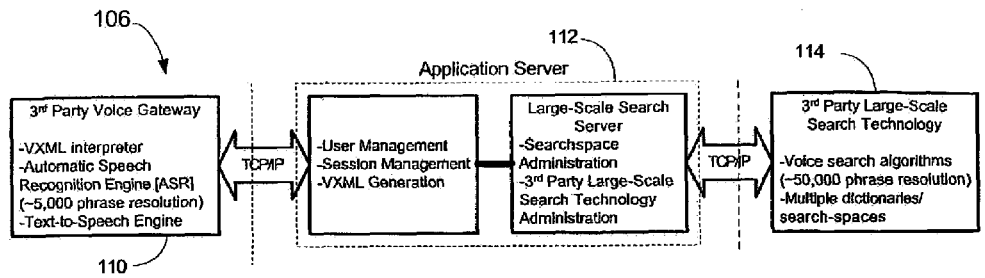
FIG. 5 is a block diagram and FIG. 6 is a related flow chart, both illustrating an embodiment of overall flow of interactions between a Voice Gateway, an application server and a third party large-scale grammar search provider that may be utilized in a method for providing large-scale grammar resolution on an application server.
Figure 6:
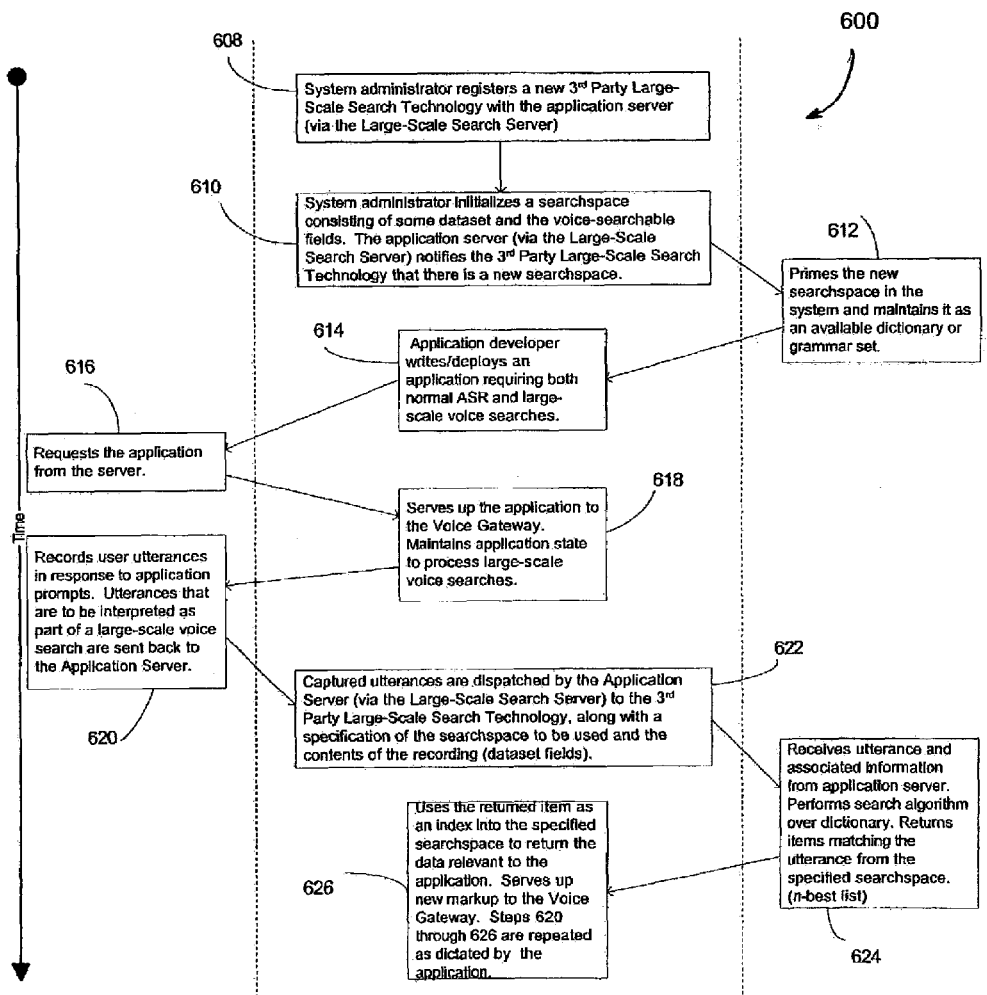

FIG. 5 is a block diagram and FIG. 6 is a related flow chart illustrating one embodiment of overall flow of interactions 600 in the network 106 utilized in a method for providing large-scale grammar resolution on an application server 112. The block diagram of FIG. 5 illustrates some functions of one embodiment of the network configuration 106 that includes the Voice Gateway 110, the application server 112, and the third party large search provider 114, as well as their mutual communication links.

The flow chart of FIG. 6 first depicts, as shown at step 608, a preliminary phase that reflects an example of the setup and the coordination utilized for the initial registration of a new third-party large-scale search technology 114 with an application server 112. Step 610 illustrates the initialization of a search space and the notification of the new search space to third-party large-scale search technology, and the initialization of the new search space and the development of corresponding applications is illustrated, at steps 612 and 614 respectively.

Once this preliminary phase is completed, the large-scale grammar search system of the network 106 is ready to provide large-scale grammar resolution on the application server 112. The Voice Gateway 110 requests an application from the application server 112, at step 616, based for example on a dialed telephone number or a user input request. In turn, the application server 112 serves up the requested application to the Voice Gateway 110 at step 618. The end-user utterance is captured by the Voice Gateway 110 and forwarded to the application server 112 at step 620. The user utterance may also be from other sources such as an application. The utterance is then dispatched to the third party large-scale technology provider 114 along with the specification of the search space, at step 622. Once the utterance with its associated information are received by the third party search provider 114, a search algorithm is performed by the third-party large scale search technology over the relevant search space to return a corresponding n-best list of matches, at step 624. The application server 112, then, uses the returned items as an index into the specified search-space to return the data relevant to the application, at step 626. Note that steps 620 through 626 may be repeated as necessary according to the application.

FIGS. 7 through 16 are related flow diagram that illustrate an example of a directory application 700 and the related sub-dialog branches 800 through 1600 that utilize large-scale grammar resolution on an application server.

Figure 7:
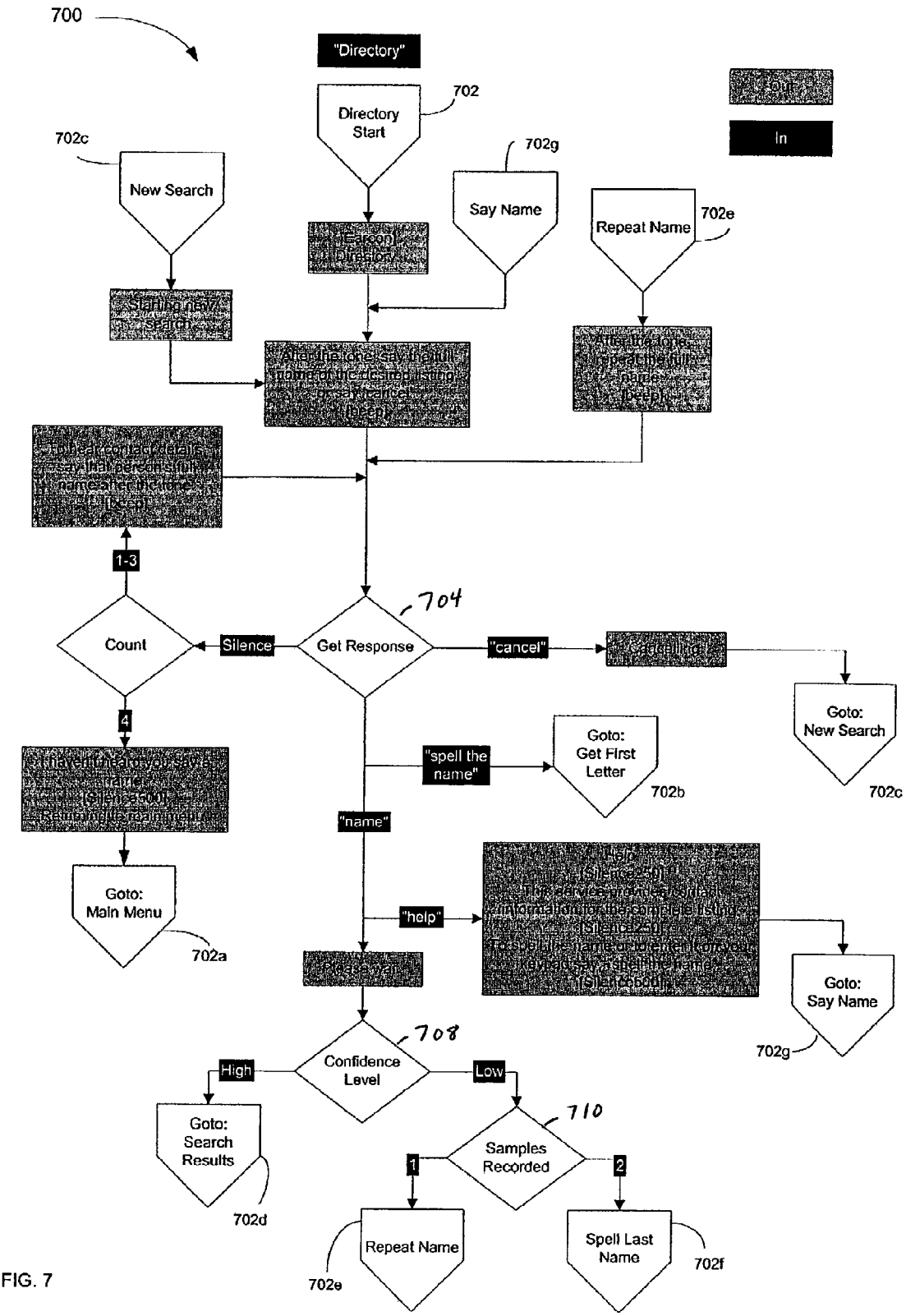
FIGS. 7 through 16 are related flow diagrams that illustrate an example of a directory application that utilizes large-scale grammar resolution on an application server.

Referring to FIG. 7, an embodiment of a directory dialog 700 starts at step 702. The progress of an end-user call through the directory dialog 700 in the illustrated embodiment relies on a multitude of outputs, shown as gray boxes, which are statements produced by the related application, and on the user inputs, which are the user responses shown as black boxes to those application statements. As shown, the directory dialog 700 would prompt the user for specific responses based on the user's previous inputs. For example, once the application seeks a response to a "full name" or a "cancel" prompt, at step 704, it may be directed to a "new search" sub-dialog branch of the directory dialog for a "cancel" user's input as in step 702*c*, or to the "main menu" if the user failed to provide any response, as in step 702*a*. Whereas if the user did spell the desired name, the directory dialog would ask the user to spell the person's name one letter at a time or to enter it on the touch-tone keypad, as in step 702*b*. A "help" input would prompt the user to say the person's name as in step 702*g*. If the user utterance provides a full "name" input, the application would analyze it for a confidence level, at step 708. A high confidence level would lead to a search results directory branch for item matching, as in step 702*d*. A low confidence level would lead to a check of recorded samples, at step 710. The check of recorded samples may to lead a "repeat name" branch as in step 702*e*, or to "spell last name" branch as in step 702*f*.

Figure 8:
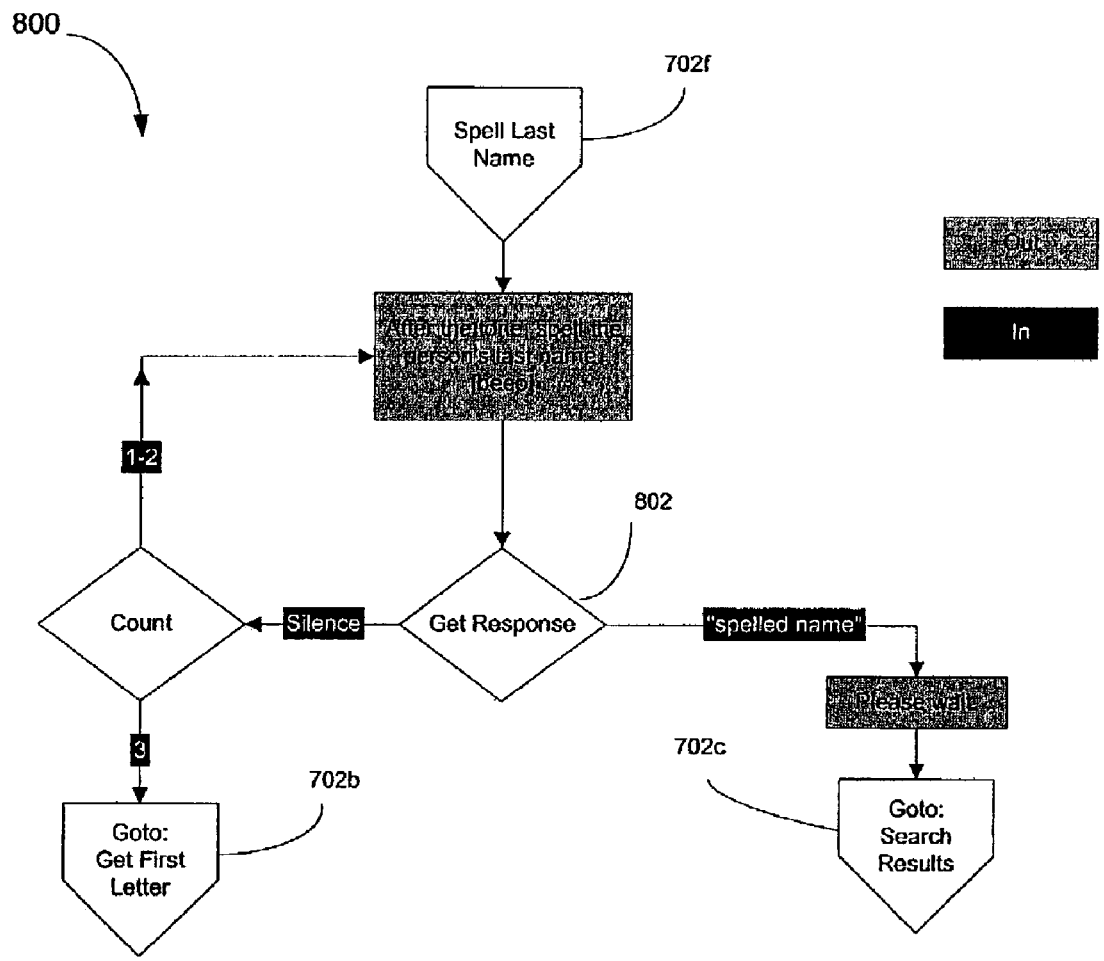

Referring to the exemplary embodiment of a sub-dialog branch 800 illustrated in FIG. 8, once a "Spell last name" sub-dialog branch is initiated at step 702*f*, the application seeks a response to a "spell the person's last name" prompt, at step 802, it may be directed to a "search results" new search sub-dialog branch for a "spelled name" user's input as in step 702*c*, or depending on how many times the user failed to provide a response to the "spell the person's last name" prompt, it may be directed to the "get first letter" sub-dialog branch, as in step 702*b*.

Figure 9:
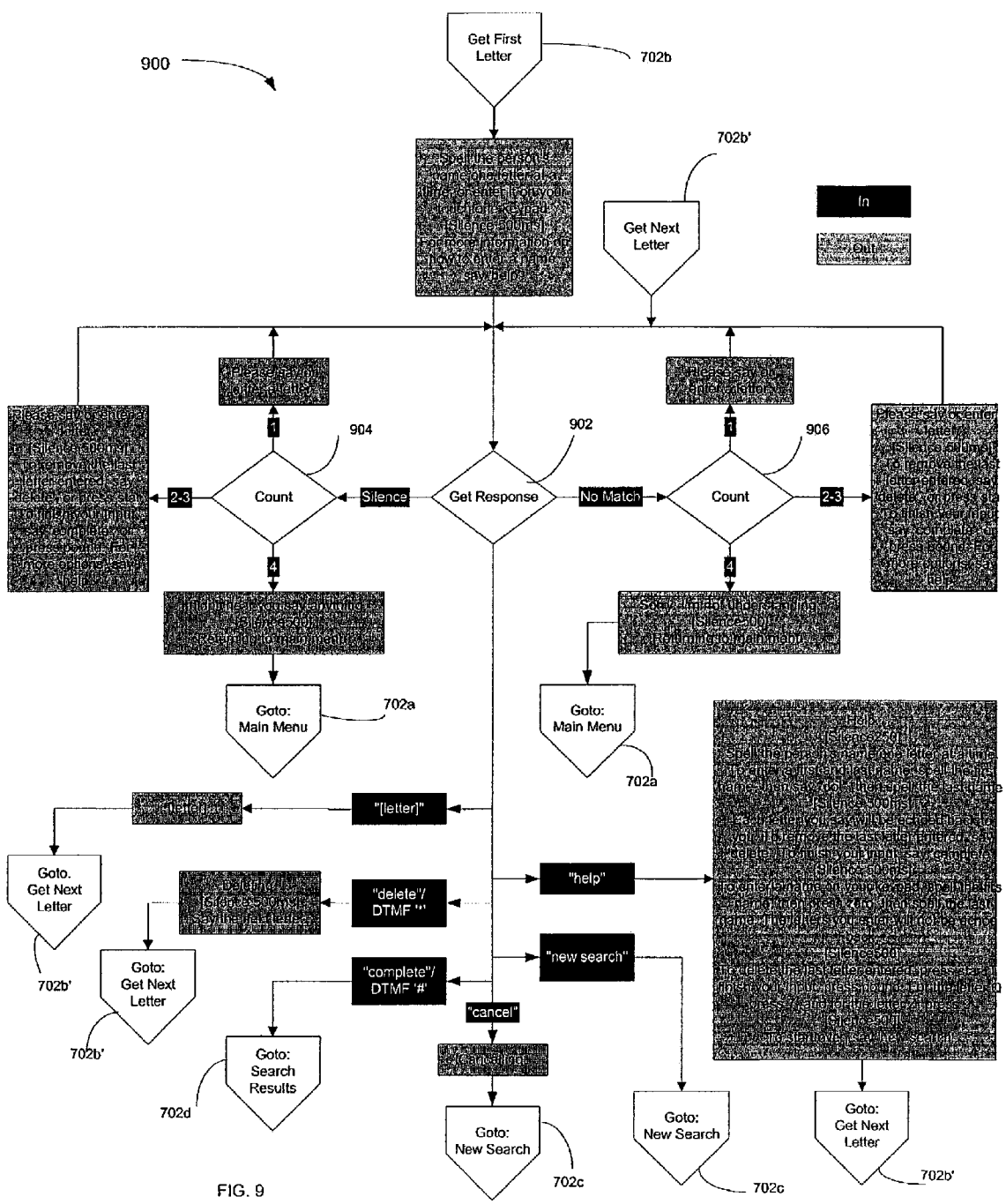

Referring to FIG. 9, once a "Get first letter" dialog branch 900 is initiated, as in step 702*b*, the application in the embodiment of FIG. 9 seeks a response from the user to a prompt to spell the person's name one letter at a time or to enter it on the touch-tone keypad, at step 902. If the user fails to provide a response, after an allowable number of similar repeat prompts, or if the utterance is not matched by the application, at steps 904 and 906, the user is directed to the "main menu" dialog branch, at step 702*a*. If the user successfully spells/enters the requested letter, or requests a delete of the last utterance, or seeks help, the application would return to the beginning of the current dialog branch by initiating a "get next letter" as in step 702*b'*. If the spelling of the person's name were completed, the application would initiate the "search results" branch as in step 702*d*, to return matching items. If the user spells/enters a "help", a "letter" or a "delete" utterance, the application would proceed to a "Get next letter" branch of the dialog, as in step 702*b'*. Otherwise, subsequently to a "new search" user utterance, the application would proceed to a "New Search" branch as in step 702*c*.

Figure 10:
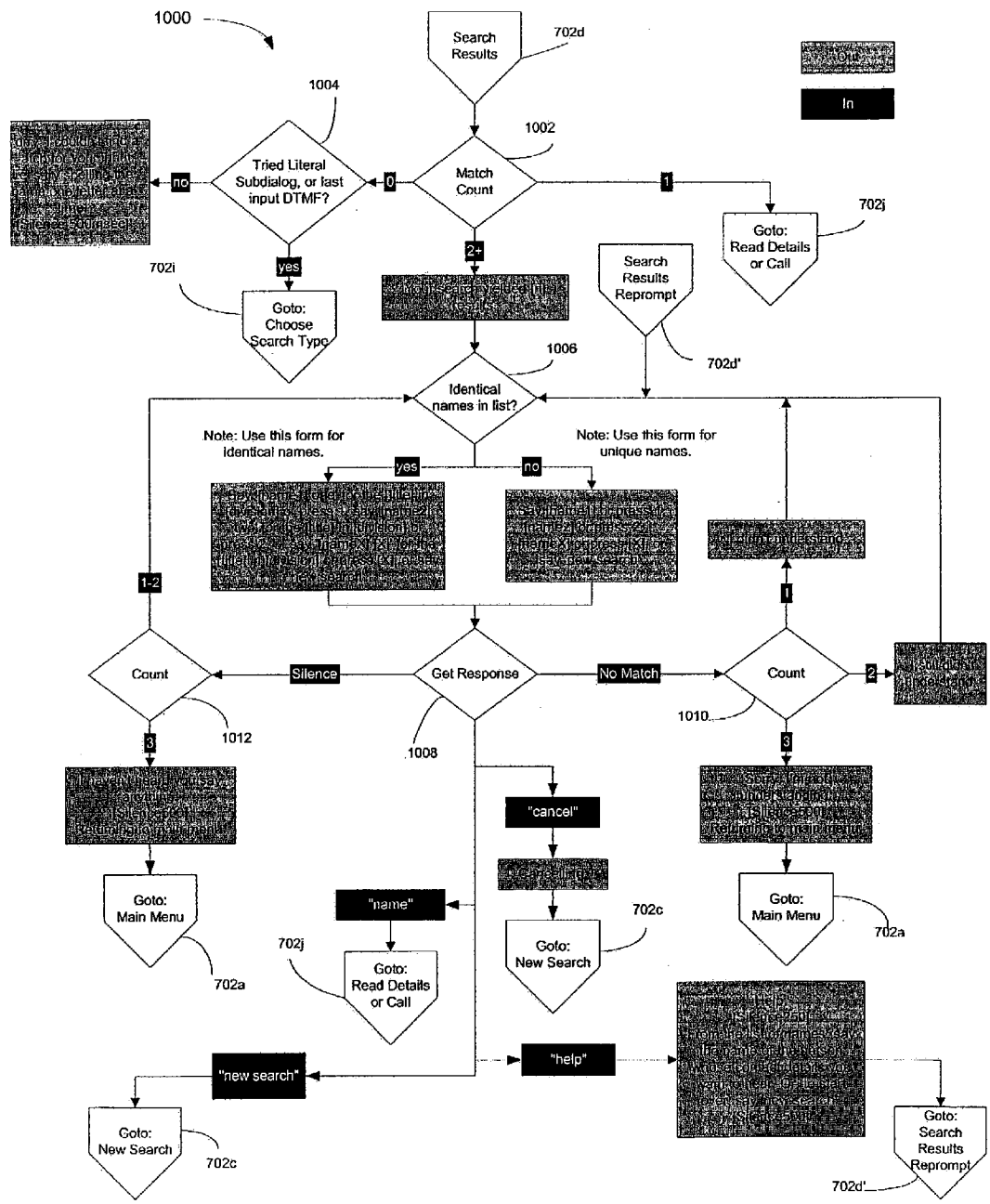

Referring to the example embodiment of FIG. 10, once a "search results" dialog branch 1000 is initiated, at step 702d, a match count test is performed at step 1002. A count of zero matches would lead to a check as to whether the input was entered by either spelling the name or pressing touchtone (DTMF) keys, at step 1004. In the affirmative, a "choose search type" sub-dialog branch would be initiated, at step 702i, otherwise, the user would be asked to retry spelling the name one letter at a time. A favorable count of one would make the application initiate a "read details or call" sub-dialog branch, as in step 702j. Whereas if the match count is equal or greater than 2, a test for identical names is pursued at step 1006. The application would seek a response to prompts that cater to 2 separate situations, i.e. results with either unique or identical names, at step 1008. Subsequently and after a predetermined number of attempts, at steps 1010 and 1012, a failure to respond by the user or a failure to match the user's input would lead the application to initiate a "main menu" sub-dialog branch, as in step 702a. Otherwise, a user response requesting to "cancel" or to initiate a "new search" would initiate a "new search" sub-dialog branch, as in step 702c. A request for "help" would initiate a re-prompt of the current sub-dialog branch as in step 702d'. A successful name spelling would initiate a "read details or call" sub-dialog branch to retrieve relevant contact information for the matched person's name, as in step 702j.

Figure 11:
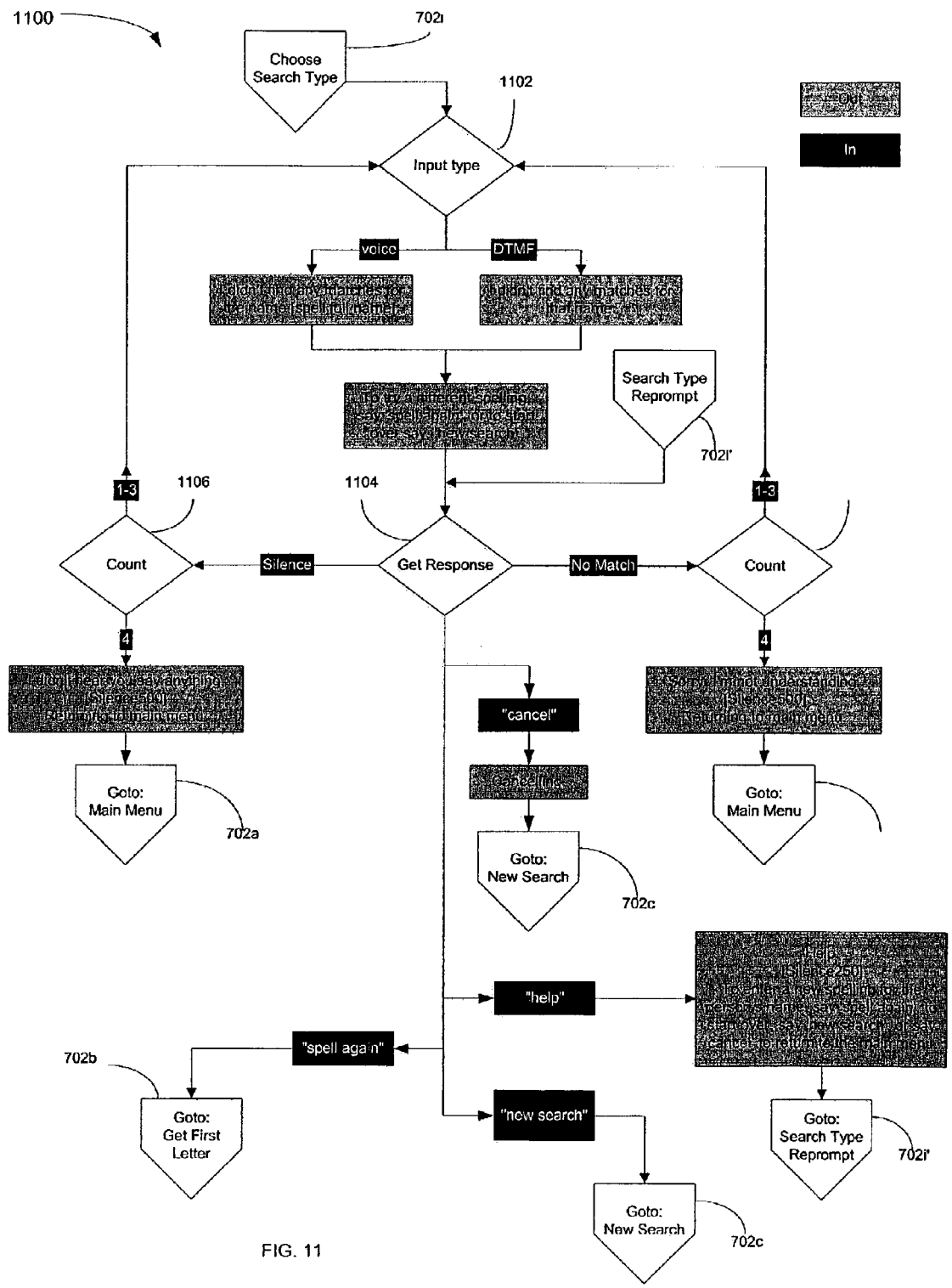

Referring to FIG. 11, once a "choose search type" sub-dialog branch 1100 is initiated, at step 702i, a user, in the illustrated embodiment of FIG. 11, could choose to either spell the person's name one letter at a time (voice input) or to enter it on the touch-tone keypad (DTMF input), at step 1102. Subsequently, the application would seek a response to a request to spell again or to start over with a new search, at step 1104. If the user fails to provide a response, after an allowable number of similar prompts, or if the utterance is not understood by the application, the user is directed to the "main menu" sub-dialog branch as in step 702a. If the user requests a "cancel" or a "new search", the application would proceed to a "new search" sub-dialog branch as in step 702c. If the user seeks "help", then the application would initiate a "search type" re-prompt as in step 702i'. Otherwise, a "spell again" input by the user, would make the application initiate a "get first letter" sub-dialog branch, as in step 702b.

Figure 12:
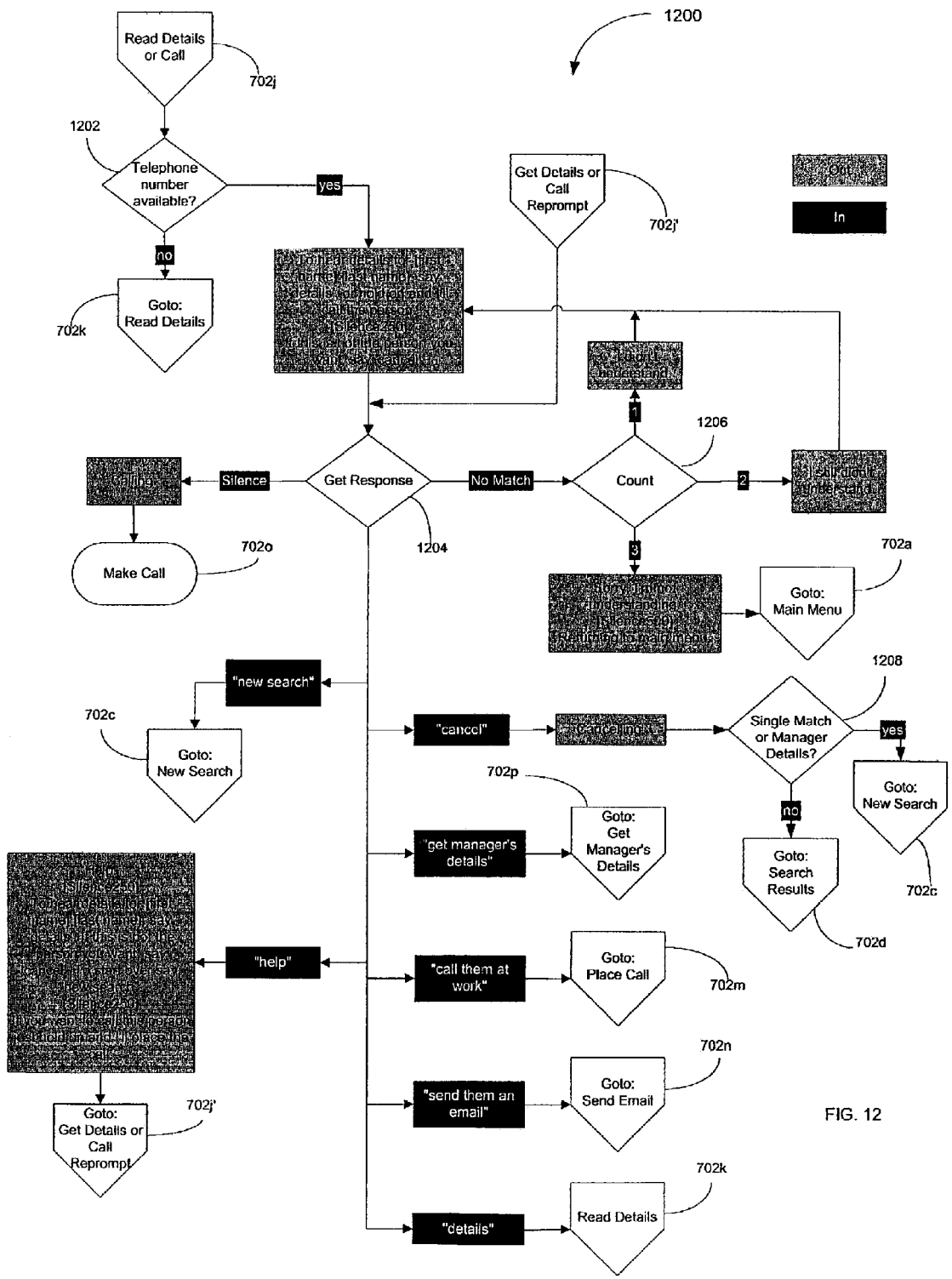

Referring to the embodiment of FIG. 12, once a "read details or call" sub-dialog branch 1200 is initiated at step 702j a failed telephone number availability check, at step 1202, would make the application initiate a "read details" sub-dialog branch, at step 702k. Subsequently to a successful telephone number availability check, the application would seek a response to a "say details" or "hold and I'll call the person" or "say cancel" prompt, at step 1204. If no response is detected, a sub-dialog branch to call the person is initiated at step 702o. If the application is unable to match the user utterance, it would return the user to the main menu, at step 702a. A "cancel" utterance input by the user would lead to the "search results" or the "new search" sub-dialog branches, at step 702d and 702c respectively. A "get manager's details" utterance would lead the user to the corresponding branch at step 702p. Similarly, other corresponding utterances would lead the user to the "place call", or the "send email", or the "details", or to a re-prompt of the "get details or call" branch, at steps 702m or 702n or 702k or 702j' respectively.

Figure 13:
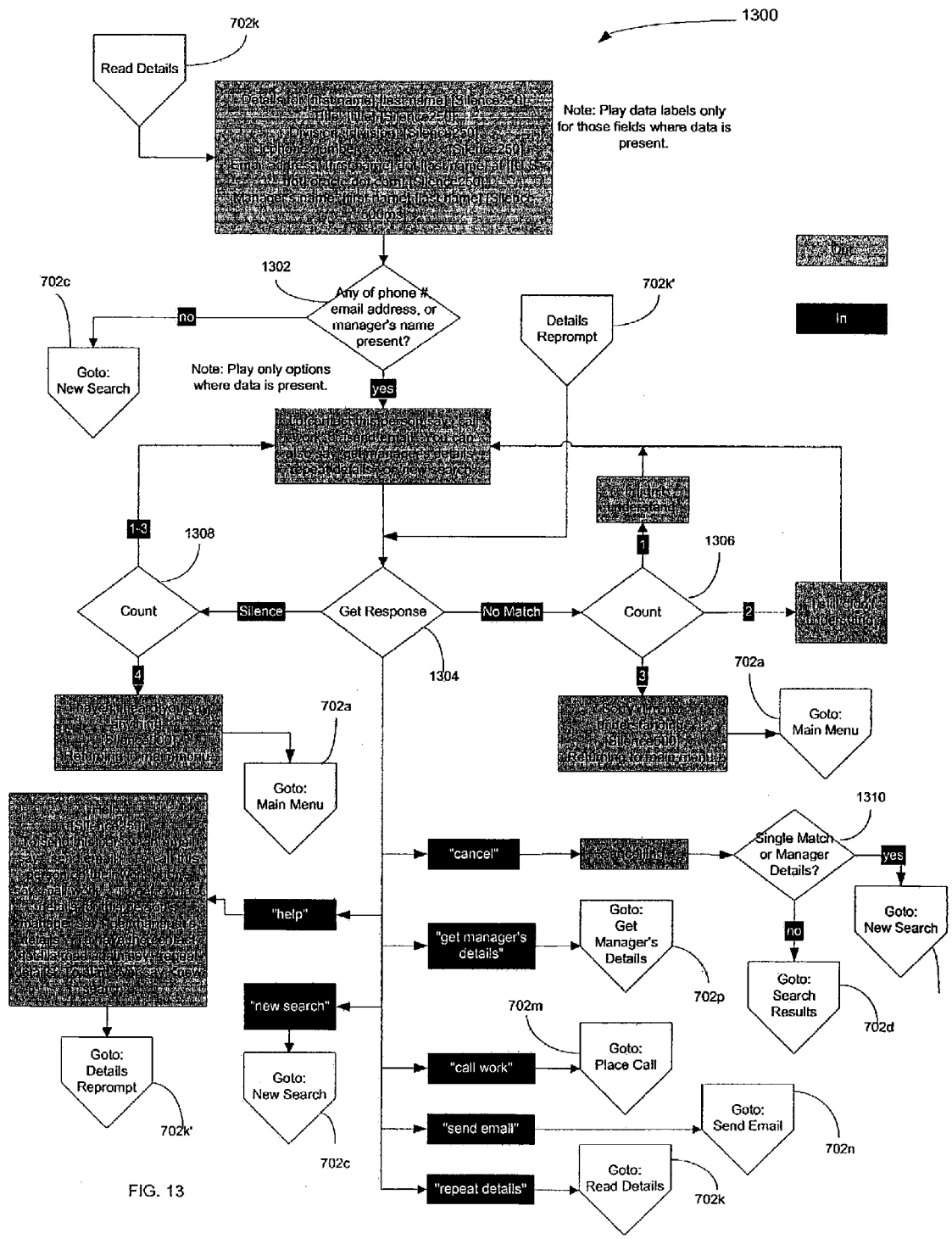

Referring to the embodiment of FIG. 13, once a "read details" sub-dialog branch 1300 is initiated at step 702k, the application would provide details such as first name, last name, title, division, email address, manager's name, etc. Subsequently a check whether any phone numbers, email addresses, or manager's name were present is performed at step 1302. In the negative, the application would initiate a "new search" sub-dialog branch, at step 702c. In the affirmative, the application would seek a response for either a "call work", "send email", "get manager's email", "repeat details", or "new search" prompt, at step 1304. If no response is detected after 4 attempt prompts, at step 1308, a sub-dialog branch to return to the main menu is initiated at step 702a. If the application is unable to match the user utterance after at 3 attempt prompts, it would return the user to the main menu, at step 702a. Otherwise, a "cancel" utterance input by the user would lead to the "search results" or the "new search" sub-dialog branches, at step 702d and 702c respectively. Similarly, other utterances would lead the user to their corresponding "get manager's details", the "place call", the "send email", the "read details", the "new search", or to a re-prompt of the "details" branch, at steps 702c, 702m, 702n, 702k, 702k', and 702p respectively.

Figure 14:
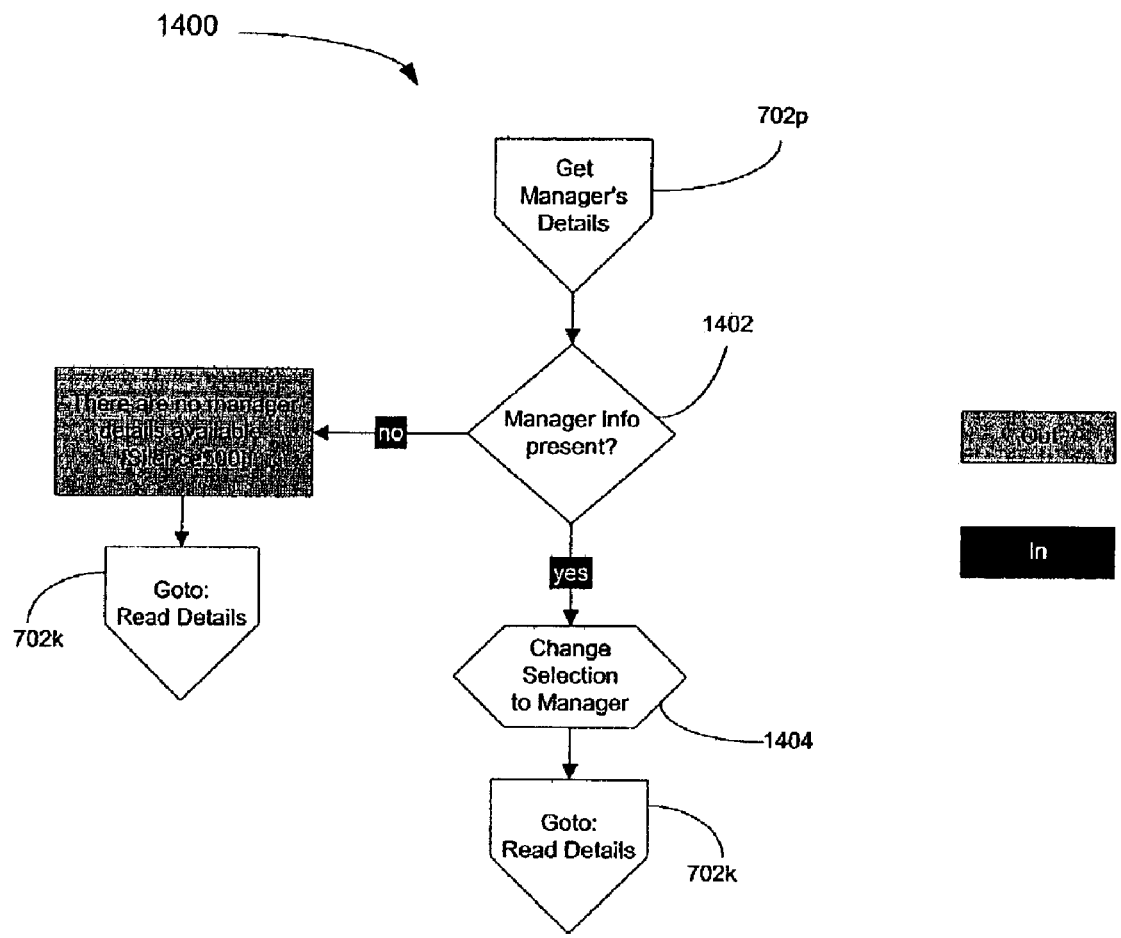

Referring to FIG. 14, once a "get manager's details" sub-dialog branch 1400 is initiated in the illustrated embodiment at step 702p, a manager presence information check is performed, at step 1402. In the negative, the application would initiate a "read details" sub-dialog branch at step 702k. Otherwise, a selection change to the manager, at step 1404, would result in the application initiating also a "read details" sub-dialog branch at step 702k, this time providing the details for the manager's directory entry.

Figure 15:
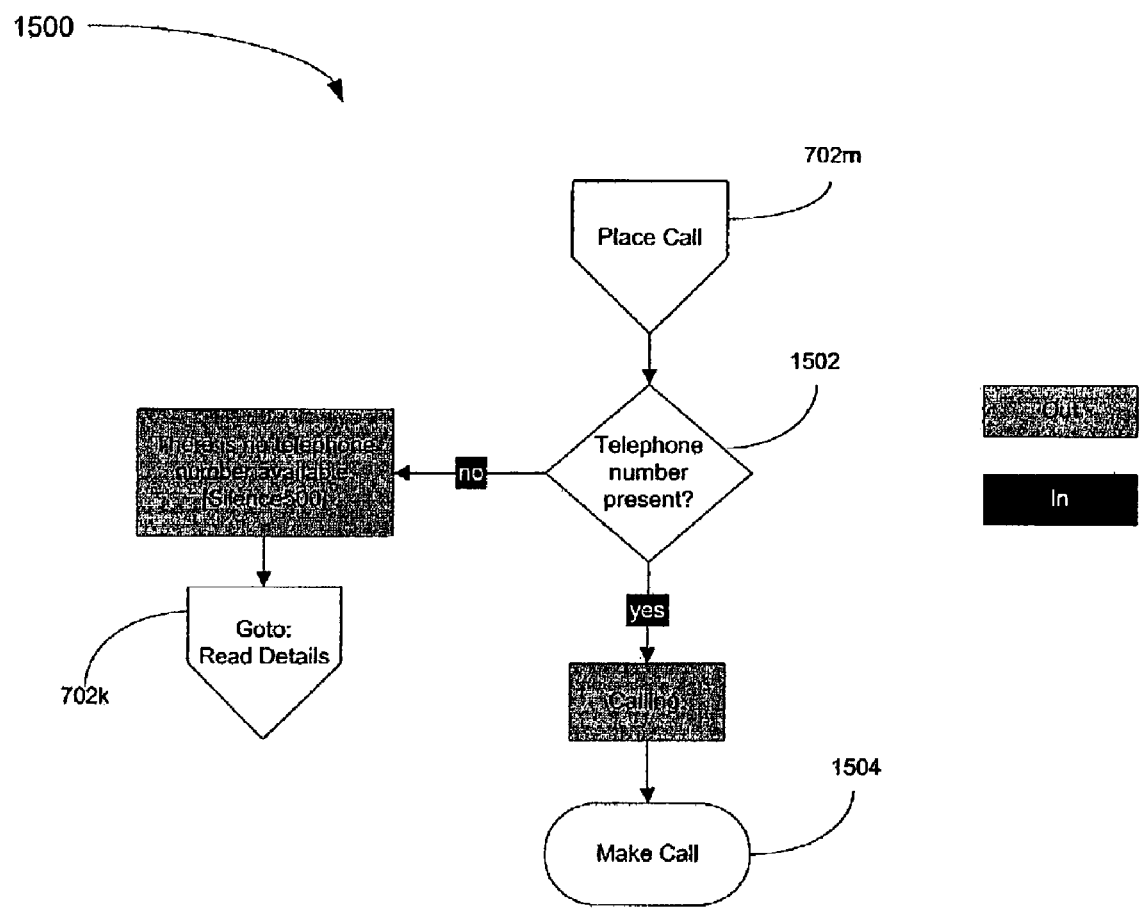

Referring to the exemplary embodiment of FIG. 15, once a "place call" sub-dialog branch 1500 is initiated at step 702m, a telephone number availability check is performed, at step 1502. In the negative, the application would initiate a "read details" sub-dialog branch at step 702k. Otherwise, a statement of "calling" is announced, and the application would make the call, at step 1504.

Figure 16:
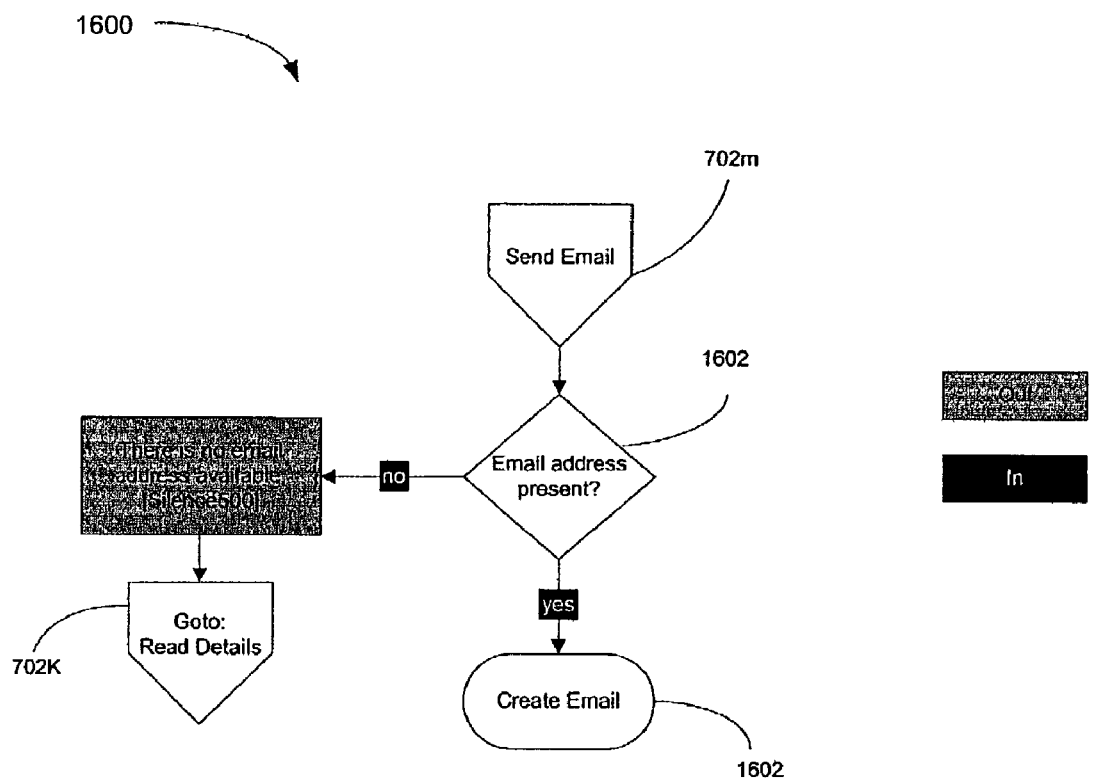

Referring to the embodiment of FIG. 16, once a "send email" sub-dialog branch 1600 is initiated at step 702n, a email address availability check is performed at step 1602. In the negative, the application would initiate a "read details" sub-dialog branch at step 702k. Otherwise, the application would create email to be sent to the selected directory entry, at step 1602.

FIGS. 17A and 17B are examples of graphical user interface displays illustrating embodiments of form box dialogs for registering and creating new search spaces on the large-scale search server administration tool. In one embodiment of FIG. 17A, a form box dialog 1700 displays the available selection of registered search spaces that may have been started or stopped, singly or in combination with others, to meet the search needs of a specific application. In another embodiment of a form box dialog 1702 illustrated in FIG. 17B, examples of characteristic entries are shown which are utilized to create and register a new search space from a specific database (DB). The entries may include the search space name, the DB connect string, the JDBC driver type (interface for connecting Java programs with SQL-based databases), and the dataset generating SQL query.

In another embodiment, the large-scale search technology may be integrated in the application server. At a first level, this integration at the application server may provide access to large-scale grammar searching of any general dataset. The key components of this application server solution may include an API that initiates searches of a search space at runtime, and that may provide the functionality of a single-turn query returning an n-best list of matches, as well as the administrative functionality to manage (prime and update) different search spaces. At a second level of integration, a generic search module may encapsulate all business logic associated with the activities of invoking the large-scale search driver. Front-end developers writing their applications on the wireless platform may utilize this search module to perform large-scale voice searches.

Specific embodiments of methods and apparatus for providing large-scale grammar resolution on an application server have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover any and all modifications, variations, or equivalents that fall within the true spirit and scope of the basic underlying principles disclosed and claimed herein.

What is claimed is:

1. A method for providing speech recognition resolution on an application server in a communication network, comprising:
    defining search spaces each comprising a dataset and identified voice searchable fields and communicating the search spaces to at least one speech recognition provider separate from the application server using an administration tool associated with the application server;
    receiving an utterance from an end-user or an input application in response to a prompt by an application running on the application server;
    capturing the utterance and dispatching the utterance via the application server to the speech recognition provider;
    performing item-matching via the speech recognition provider, and returning items matching the utterance to the application server; and
    returning relevant utterance matches to the application for communication to the user.

2. The method as in claim 1 wherein the speech recognition provider is a large-scale grammar search provider.

3. The method as in claim 2 wherein the application server runs a Web site or an Internet application, and allows the Website or the Internet application to be accessible from any browser or mobile device.

4. The method as in claim 2 wherein the large-scale grammar search provider utilizes voice search algorithms to provide an n-best search returning a weighted list of matching items.

5. The method as in claim 4 wherein the weighted list involves a confidence metric.

6. The method as in claim 2 wherein a generic search driver is utilized to communicate with any large-scale search provider, in conjunction with specific search provider drivers that format and transmit messages in a manner specific to their corresponding large-scale directory providers.

7. The method as in claim 1 wherein dispatching the utterance further comprises providing a specified search space associated with the utterance to be used by the speech recognition provider to perform the item matching.

8. The method as in claim 1 wherein a Voice Gateway, the application server and the large-scale grammar search provider are located on at least one of an Internet network and a local Internet-connected device.

9. The method as in claim 1 wherein the application server further provides a markup language page to a browser to prompt the utterance.

10. The method as in claim 9 wherein the application server communicates with other communication devices via markup language pages using at least one of VXML, XHTML, XHTML+V, SALT, HDML/WML, HTML, and MXML languages.

11. The method as in claim 1 wherein the speech recognition provider initializes and maintains search spaces in response to notification of the search spaces by the application server.

12. The method as in claim 1 wherein there are at least two different speech recognition providers and the application server utilizes the administration tool to keep track of the different speech recognition providers, and to create and manage the search spaces for each.

13. The method as in claim 1 wherein the step of capturing comprises capturing an audio recording and passing the audio recording to the large scale grammar search provider.

14. A communication system for providing speech recognition resolution on an application server in a communication network, comprising:
    means for defining search spaces each comprising a dataset and identified voice searchable fields and for communicating the search spaces to at least one speech recognition provider separate from the application server using an administration tool associated with the application server;
    means for receiving an utterance from an end-user or an input application in response to a prompt by an application running on the application server;
    means for capturing the utterance and dispatching the utterance to the speech recognition provider;
    means for performing item-matching via the speech recognition provider, and returning items matching the utterance to the application server; and
    means for returning relevant utterance matches to the application for communication to the end-user.

15. The communication system as in claim 14 wherein there are at least two different speech recognition providers each of which is a large-scale grammar search engine separate from the application server and the application server monitors the different speech providers, and creates and manages the search spaces for each.

16. The communication system as in claim 15 wherein the application is accessed through a device which comprises at least a voice markup language browser.

17. The communication system as in claim 15 wherein the means for performing item-matching provides the large scale grammar search providers the ability to utilize voice search algorithms to provide an n-best search returning a weighted list of matching items.

18. A computer-readable medium having computer-executable instructions for performing a method for providing speech recognition resolution on an application server in a communication network, the method comprising:
    defining search spaces each comprising a dataset and identified voice searchable fields, and communicating the search spaces to at least one speech recognition provider separate from the application server using an administration tool associated with the application server;
    receiving an utterance from an end-user or an input application in respond to a prompt by an application running on the application server;
    capturing the utterance and dispatching it via the application server to the speech recognition provider;

performing item-matching via the speech recognition provider, and returning items matching the utterance to the application server; and returning relevant utterance matches to the application for communication to the user.

19. The computer-readable medium having computer-executable instructions for performing the method as in claim 18 wherein there are at least two different speech recognition providers each of which is a large scale grammar search engine separate from the application server and the application server monitors the different speech providers, and creates and manages the search spaces for each.

20. The computer-readable medium having computer-executable instructions for performing the method as in claim 19 wherein the large-scale grammar search providers utilize voice search algorithms to provide an n-best search returning a weighted list of matching items.

21. The computer-readable medium having computer-executable instructions for performing the method as in claim 19 wherein the application is accessed through a device which comprises at least a voice markup language browser.

22. The computer-readable medium having computer-executable instructions for performing the method as in claim 21 wherein the application server runs a Web site or an Internet application, and allows the Website or the application to be accessible from any browser or mobile device.

* * * * *